United States Patent Office 3,467,514
Patented Sept. 16, 1969

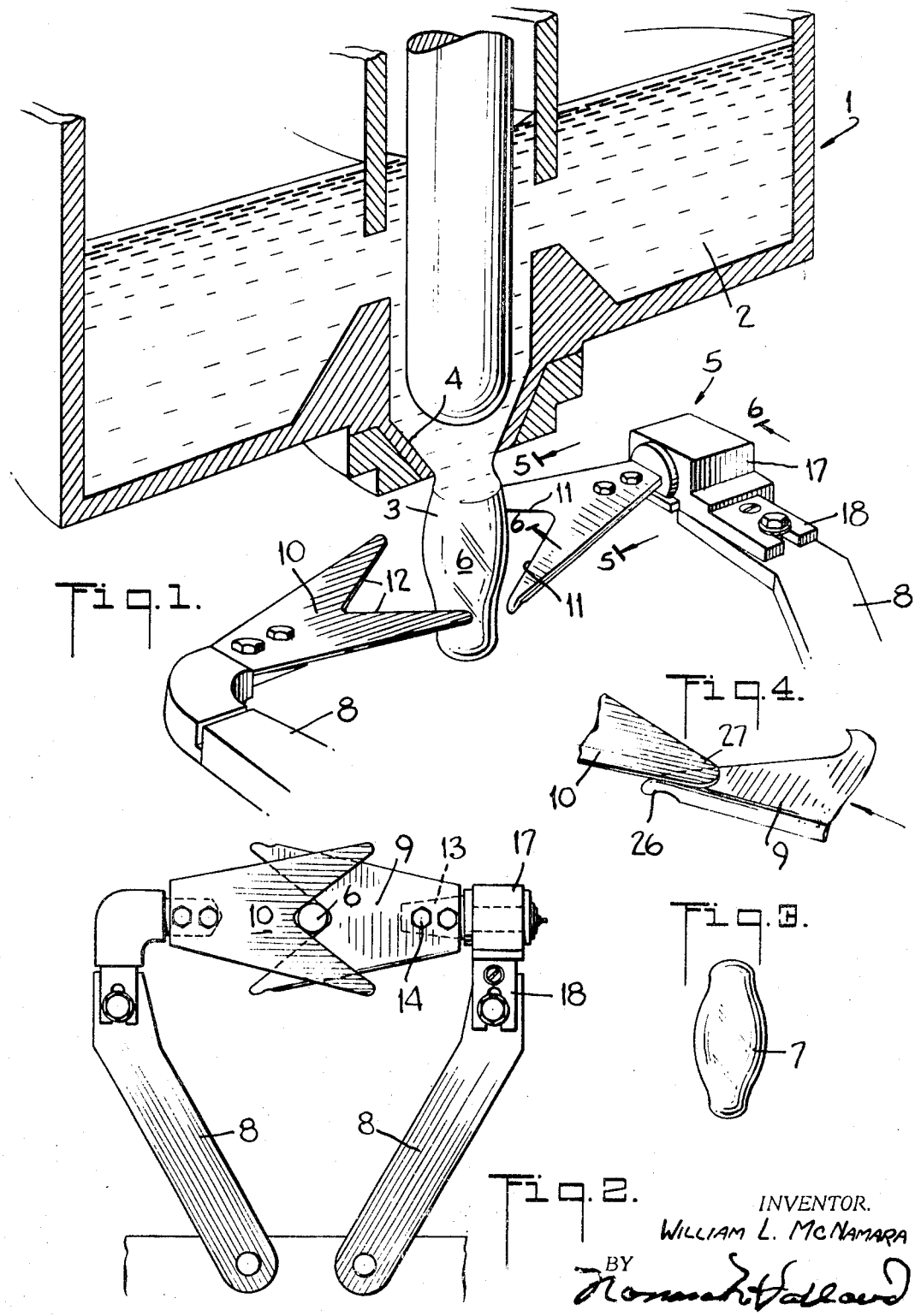

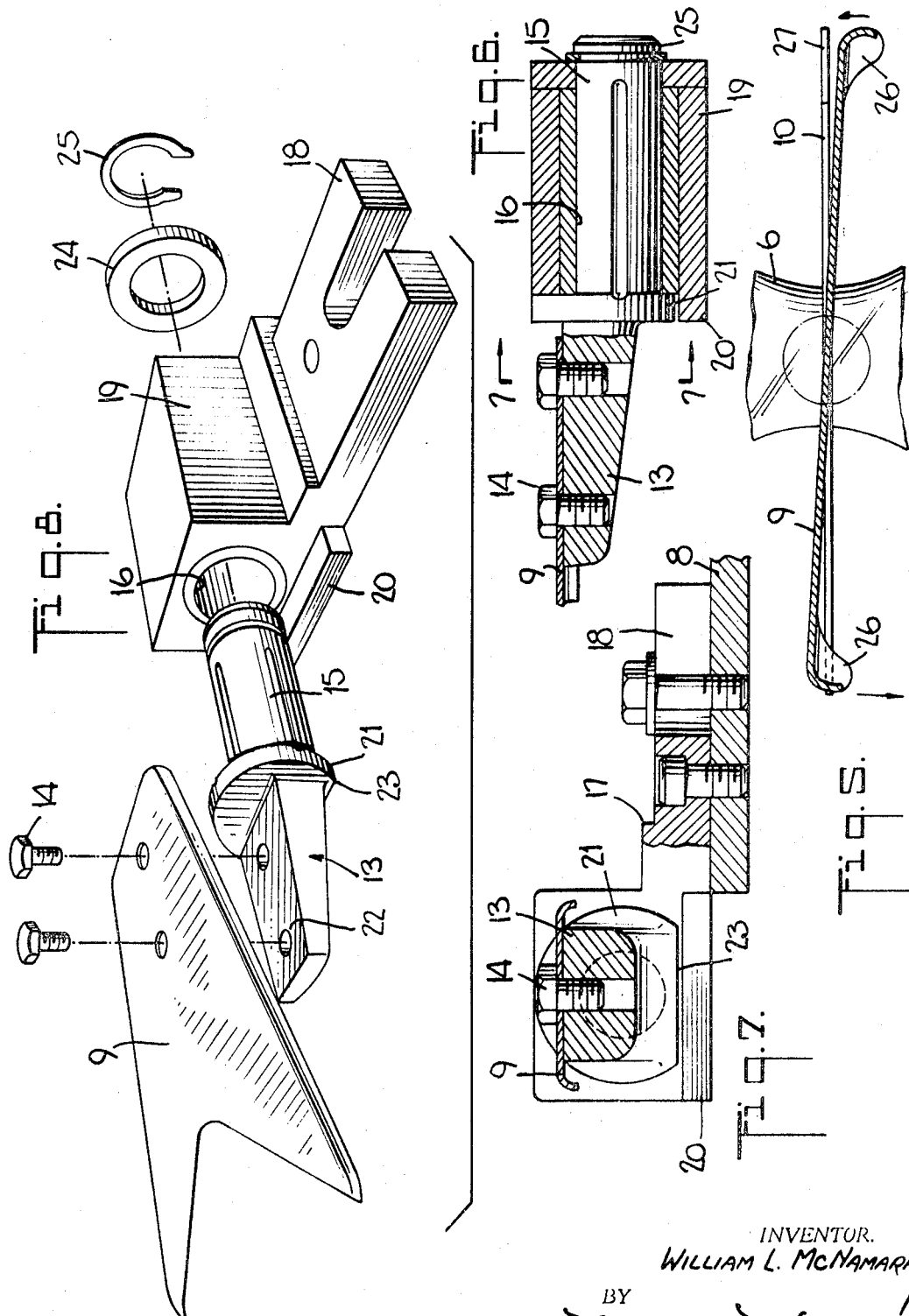

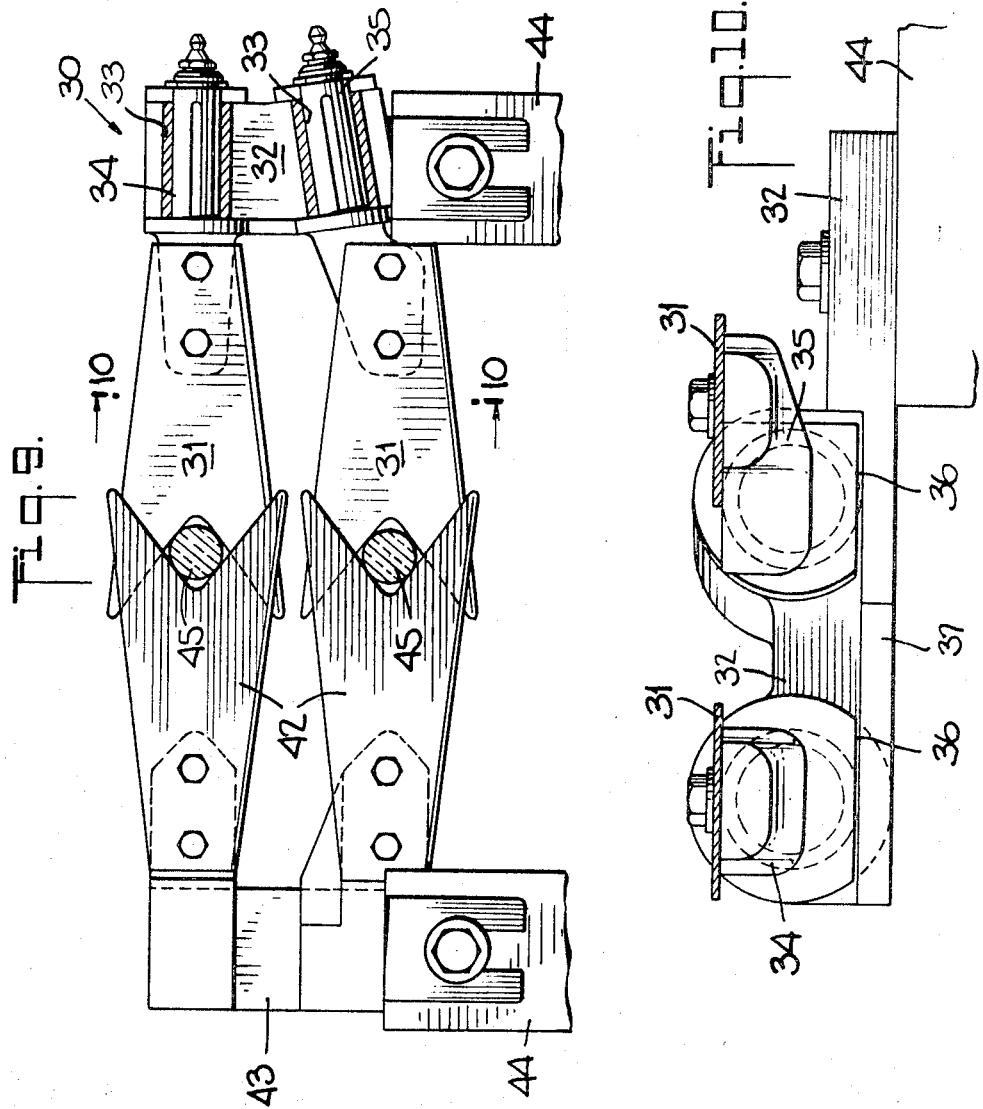

3,467,514
SELF-ALIGNING GLASS SHEARS
William L. McNamara, Lancaster, Ohio, assignor to Anchor Hocking Corporation, Lancaster, Ohio, a corporation of Delaware
Filed July 20, 1966, Ser. No. 566,503
Int. Cl. C03b 5/38, 21/02
U.S. Cl. 65—334                      2 Claims

ABSTRACT OF THE DISCLOSURE

A self-aligning shear blade mechanism for cutting glass into gobs which comprises a first shear blade that is mounted in a rotary mount so that upon engagement with its related cutting blade, the contact force will turn the first blade into proper cutting alignment with the related blade.

---

The present invention relates to the manufacture of glass and more particularly to an improved shear blade mounting for shear blades such as are used in forming gobs of glass from a stream of glass flowing from a glass furnace forehearth orifice.

This invention is an improvement upon my application Ser. No. 407,507 filed Oct. 29, 1964, now abandoned.

Shears in accordance with the present invention are employed in the manufacture of glass articles at the outlet of a glass furnace forehearth. The glass is fed from the furnace forehearth through the orifice of a feeder which directs the molten glass in a generally vertical stream from the furnace outlet. Gob cutting shears are employed to periodically sever the lowermost portion of this flowing stream into a discrete glass gob of predetermined volume. This gob after being severed is permitted to fall or slide down a suitable feed chute into a glass forming mold or other glass forming device.

The cutting of these gobs of glass is a critical operation where minor defects or irregularities formed as the gob is cut may result in a defectively formed glass article. For example, a surface defect may be present upon the completely formed glass article in the form of a long thin scar. These marks are called shear marks as they have been found to result from an improper gob cutting and particularly from a misalignment or improper engagement of the shear blades. These marks are objectionable in that they result in unacceptable glassware. They are particularly troublesome since the defect or misalignment in the shears which is causing the shear marks may injure a significant number of articles before the trouble is detected and corrected.

One of the principal causes of such shear marks is a misalignment between the cooperating shear blades which perform the cutting. Such a misalignment may result from unequal wear or a bending or twisting of one blade with respect to the other due to the original mounting or for a variety of other reasons. Excessive blade wear, in particular, has been a serious problem as the blades have been purposely forced together under high pressure so that blade flexing would correct for misalignment.

The improved shears of the present invention have been found to virtually eliminate such marks by providing a self-aligning mounting for the shear blades. As will be further described below, not only has an unexpected operating improvement been obtained with this mounting, but the degree of self-alignment required for this improvement has been found to be relatively slight. The necessary but slight correction or self-alignment required has been found to be obtainable in a simple rugged, and automatically operated self-aligning mounting which will now be described in greater detail.

Accordingly, an object of the present invention is to provide a new and improved mounting for glass cutting shear blades.

Another object of the present invention is to provide a self-aligning or self-adjusting mounting for shear blades.

Another object of the present invention is to provide a self-aligning shear blade mounting combining ruggedness and simplicity with precise operation.

Another object of the present invention is to provide an improved shear blade mounting for providing better gob formation and a resulting reduction in the cost of the manufacture of glass articles.

Another object of the present invention is to provide an improved shear blade mounting for substantially eliminating shear marks in finished glass articles.

Other and further objects of the invention will be obvious upon an understanding of the illustrative embodiment about to be described or will be indicated in the appended claims and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view partially in section illustrating a feeder with shear blades moving towards the gob cutting position;

FIG. 2 is a top plan view illustrating the shears in their cutting position;

FIG. 3 is a side elevational view of a glass gob cut from a stream of molten glass;

FIG. 4 is an enlarged detailed view illustrating the initial engagement between the tips of the shear blades;

FIG. 5 is a sectional view taken along line 5—5 on FIG. 1;

FIG. 6 is a sectional view taken along line 6—6 on FIG. 1;

FIG. 7 is a sectional view taken along line 7—7 on FIG. 6;

FIG. 8 is an exploded perspective view showing an improved shear blade mounting in accordance with the present invention;

FIG. 9 is a top plan view of another embodiment illustrating a dual gob cutter; and FIG. 10 is a vertical sectional view taken along line 10—10 on FIG. 9.

FIG. 1 of the drawings illustrates the forehearth 1 of a glass furnace in which molten glass 2 is being delivered in a downwardly flowing stream 3 from the feeder outlet 4. The gob cutting shears 5 in accordance with the present invention are mounted at the stream of glass 3 and are positioned to periodically sever the end portion 6 of the glass stream 3 causing it to fall free of the stream 3 as an individual glass gob 7 as illustrated in FIG. 3.

A suitable mechanical drive (not illustrated) for operating the shears 5 by intermittently moving them from an open position as illustrated in FIG. 1 through a cutting position as illustrated in FIG. 2 is coupled to the shear operating arms 8. This cutting operation is timed so that a gob 7 of predetermined volume is severed from the slowly flowing glass stream 3 with the timing adjusted with respect to the cross-section of the stream so that a gob of predetermined volume is formed.

The shear blades 9 and 10 preferably have a generally V-shaped form as illustrated so that the four central edges 11 and 12 may close into engagement with one another and so that a double shearing action is provided between the oppositely positioned blades 9 and 10. When the shearing edges of each pair are in firm sliding engagement, the above described shearing operation severs the gob 7 with no objectionable marks or surface irregularities resulting at the surface of the glass gob.

Even the slightest misalignment of the four shearing edges 11 and 12, however, has been found to form objectionable shear marks. Such a misalignment which may be caused by initial misalignment or by unequal wear or improper blade movement or for a variety of other reasons has been found to increase the shear marks to an extent whereby normal glass flow action in the gob 7 is insufficient to remove the mark. The result is the retention of the mark throughout the glass-forming operation so that a mark of significant and objectionable size is present on the finished article making it unacceptable.

Previous attempts to reduce the shear marks included mounting the shear blades so that their shearing surfaces met one another during the gob cutting stroke under relatively great pressure. This pressure caused one or both of the blades to warp or bend so that the shearing edges accommodated themselves, this high pressure caused rapid and uneven blade wear which then caused the deformation of the blades so that shear marks again resulted.

The self-alignment means for the shears of the present invention will now be described in detail. The self-aligning shear blade mounting comprises a detachable blade 9 mounted on a shank 13 by bolts 14. The shank 13 includes a cylindrical bearing surface 15 proportioned for free rotary movement in a bearing sleeve 16 fitted into a bearing block 17 attached to operat ing arm 8. The preferred embodiment of the bearing block 17 includes a slotted attaching flange 18 which facilitates its bolted connection to the operating arm 8. The bearing block 17 includes an outer enlarged end portion 19 to accommodate the bearing sleeve 16 and also includes a projecting stop 20 to limit the maximum degree of shear blade turning in both directions. A cooperating stop 21 is provided on the shank 13 between the bearing surface 15 and the blade mounting portion 22 and it has a lower stop surface 23 best illustrated in FIG. 7 to limit the rotation of the blade 9 in its open position by permitting a rotation of a fraction of a degree or more in either direction which is sufficient to permit the self-aligning action as the blades 9 and 10 are closed. The shank 13 is held in position on the bearing block with washer 24 and the lock washer 25.

To provide a sharp flawless cutting of each gob 7, it is preferable that the four contacting shear edges 11 and 12 be generally coplanar so that they remain in firm engagement with each other throughout the entire shearing stroke.

In accordance with the present invention, generally planar surfaces are provided on the blades 9 and 10 adjacent the four shearing edges 11 and 12 and the blades 9 and 10 are mounted so that the lower shearing edges 12 of the upper blade 10 engage the upper shearing edges 11 of the lower blade 9 during the shear closing action and with the self-aligning blade 9 maintaining itself generally parallel to the fixed or upper blade 10. The contact pressure between the blade edges 11 and 12 is seen to substantially equalize itself due to the turning of blade 9 and not only does this facilitate the firm engagement between the four shearing edges but it also tends to equalize the forces between the two sides of the blades 9 and 10 to equalize blade wear. The blade rotation and self-adjustment also permits the contact pressure to be substantially reduced as no bending or warping of the blades is required and this substantially reduces the blade wear. In addition, whatever wear is experienced is substantially equal on opposite sides of the blade so that the initial alignment is unaffected over relative long periods.

Since the self-aligning blade 9 is permitted to rotate in its opened position by an amount controlled by the stop 20 and 21, the forward portions of this blade or of the fixed blade 10 or of both blades are provided with a camming or adjusting surface 26 to insure the proper relative alignment of the blades 9 and 10 during their initial and subsequent engagement no matter what the particular tilt of the rotatably mounted blade 9 is in its open position. FIG. 4 illustrates the initial contact between end portions 26 and 27 of the two blades 9 and 10. FIG. 5 also illustrates a typical relative alignment of the blades 9 and 10 prior to their initial contact and shows the sloping end portion 26 which will swing the blade 9 as illustrated in a counter-clockwise direction to obtain and maintain the above described and generally equalized shearing edge engagement between the two blades 9 and 10.

The problem of shear blade misalignment and the resulting defects including shear marks is even more troublesome in furnace installations where a dual shear arrangement is used to simultaneously cut two gobs from dual glass streams. In these installations, one set of shears may be properly adjusted while the other shear blades are improperly adjusted or become misaligned during use. When it is attempted to counteract the problem of dual alignment by forcing one of the blades against one another to cause them to warp or bend into alignment, the problem of excess of uneven wear is worsened.

FIG. 9 illustrates the application of the self-aligning mounting of the present invention to a dual shear assembly 30 where a self-aligning mounting is provided for one blade 31 of each set of shears. The bearing block 32 in this case is provided with a pair of bearing holes 33 to receive independently and rotatably mounted shanks 34 and 35 each of which mounts a separate shear blade 31 as illustrated. The opposing shear blades 42 are fixedly mounted on a dual support bracket 43 as shown. It will be seen that the above described alignment action is obtained in a manner similar to that already described for the single shear mounting. As the operating arms 44 close, the dual shear system simultaneously cuts a pair of gobs from the glass streams 45.

FIG. 10 is a sectional view illustrating suitably proportioned stops 36 on each of the blade supporting shanks 34 and 35 operating in combination with an elongated stop 37 to provide a limit for the rotation of each of the blades 31 in their open position.

It will be seen that the above described self-aligning shear mount may be adapted for use with present shear blade mountings. An unexpectedly long increase of blade life and a resulting significant reduction in shear marking has been experienced. The overall result is an improved product with decreased spoilage. At the same time, the lengthened shear life reduces maintenance as the frequent adjustments previously required for the shear blade positions are substantially eliminated.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. In a shear means for cutting gobs of glass from a stream of molten glass and including a pair of cooperating shear blades each being attached at one end to an operating arm for moving the blades from an open position spaced from the glass stream to a closed position in shearing engagement with the glass stream and said shear blades each having a pair of planar shearing edges diverging toward their other end the improvement comprising the said attachment of one of said blades to its operating arm being a fixed attachment, the said attachment of the other of said blades to the other operating arm comprising a bearing on the other of said operating arms, a shank for attaching the other of said blades to the bearing, said shank having an axis of rotation generally parallel to the direction of movement of said other blade whereby the said plane of said other blade tilts with respect to the said plane of the first fixedly mounted blade, camming means at the said other end of one of the shear blades sloping outwardly of the plane of the said one blade for engaging the opposite shear blade as the blades are moved toward the glass stream by the operating arms for thereby turning the plane of said other shear blade into alignment with the plane of said fixedly attached blade and moving the shearing edges of said blades into contact with one another.

2. The shear means as claimed in claim 1 which further comprises a stop coupled to said shank for movement therewith, and a cooperating stop coupled to said operating arm and spaced from said first stop for limiting the movement of said shank in said bearing.

References Cited

UNITED STATES PATENTS

| | | | |
|---|---|---|---|
| 1,444,327 | 2/1923 | Byrd | 65—334 XR |
| 1,760,435 | 5/1930 | Peiler | 65—334 XR |
| 2,042,994 | 6/1936 | Honiss | 65—334 XR |
| 2,680,937 | 6/1954 | Peiler | 65—334 XR |

S. LEON BASHORE, Primary Examiner

F. W. MIGA, Assistant Examiner

U.S. Cl. X.R.

65—133